A. T. THOITS & J. G. GRONBERG.

FIRELESS BAKER.

APPLICATION FILED MAR. 24, 1909.

Reissued May 3, 1910. 13,110.

Witnesses:
Lucy A. Falkenberg
Sophie B. Werner.

Inventors:
Alvin T. Thoits
and John G. Gronberg.
By Parker & Carter
Attorney.

UNITED STATES PATENT OFFICE.

ALVIN T. THOITS AND JOHN G. GRONBERG, OF GRAND RAPIDS, MICHIGAN, ASSIGNORS TO CALORIC FIRELESS COOKSTOVE COMPANY, OF GRAND RAPIDS, MICHIGAN, A CORPORATION OF MICHIGAN.

FIRELESS BAKER.

13,110. Specification of Reissued Letters Patent. Reissued May 3, 1910.

Original No. 898,527, dated September 15, 1908, Serial No. 414,287. Application for reissue filed March 24, 1909. Serial No. 485,558.

*To all whom it may concern:*

Be it known that we, ALVIN T. THOITS and JOHN G. GRONBERG, citizens of the United States, residing at Grand Rapids, in the county of Kent and State of Michigan, have invented certain new and useful Improvements in Fireless Bakers; and we do hereby declare the following to be a full, clear, and exact description of the invention, such as will enable others skilled in the art to which it appertains to make and use the same.

Our invention relates to improvements in fireless bakers, and its object is to provide the same with various new and useful features, whereby a high temperature and dry heat may be properly and economically applied to such articles, and to provide the device with various new and useful features, as hereinafter more fully described and particularly pointed out in the claims.

Our device consists essentially of a case or receptacle provided with a lining, which is a non-conductor of heat and fire-proof, one or more solid bodies adapted to absorb and give off heat, a suitable rack or support for the same, together with the vessel in which the article to be baked may be supported and conveniently placed in or removed from the case, and in various details of construction and arrangement, as will more fully appear by reference to the accompanying drawings, in which—

Figure 1:
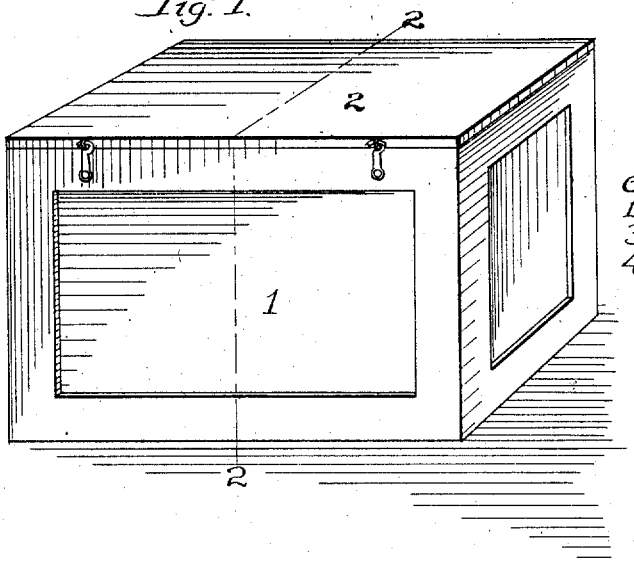
Figure 2:
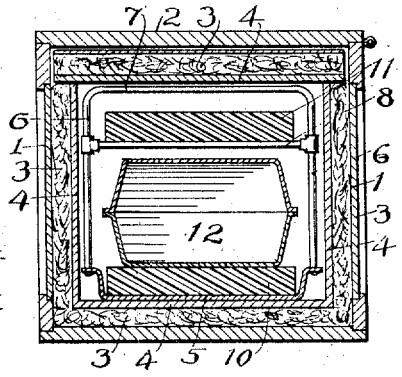
Figure 3:
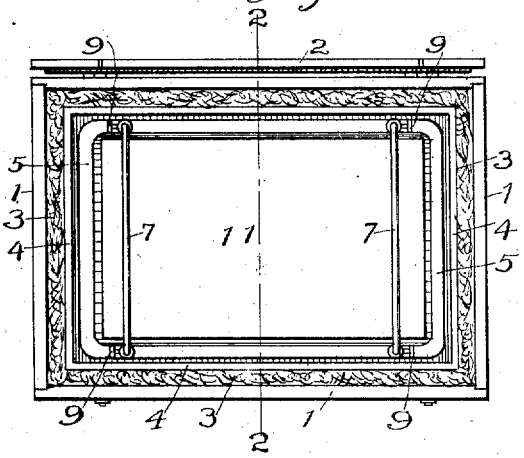
Figure 4:
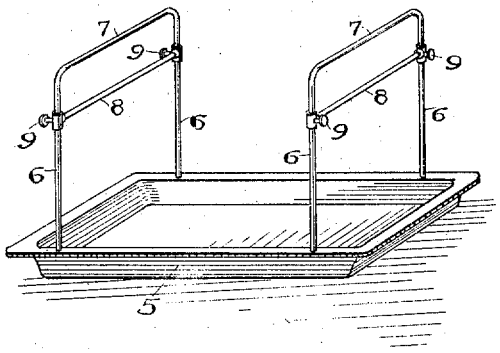

Figure 1 is a perspective view of the device closed; Fig. 2 a transverse section of the same on the line 2—2 of Figs. 1 and 3; Fig. 3 a plan view of the same with the cover opened up and the removable non-conducting pad omitted; and, Fig. 4 a perspective of the rack.

1 represents a case of any preferred dimensions having a removable cover 2 to close the same. This case is provided at the sides, ends and bottom with a non-conducting lining 3 preferably of wood fiber, mineral wool or analogous material, and an inner lining 4 preferably of asbestos, to render the device fire-proof, and also to assist in retaining the heat therein. These linings terminate a suitable distance from the top of the case, and a removable pad of like material to the linings, is provided whereby the upper part of the case is also rendered fire-proof and non-conductive of heat. When closed this case, together with the lining, forms a receptacle adapted to receive a rack shown in perspective in Fig. 4, together with its contents; said rack preferably consisting of a tray 5 of sheet metal adapted to receive any drip or overflow from the cooking vessel and also to receive and support a block 10 of heat absorbing material preferably of steatite, commonly known as soapstone, upon which block is placed any convenient vessel 12 to contain or support the material to be baked. Rods bent twice at right angles from vertical supports 6 near the respective corners of the tray and are attached thereto at their lower ends, the middle horizontal portions of said rods forming handles 7 to manually lift and move the rack and its contents. Vertically adjustable on these rods are transverse supports 8 adjustably held by set screws 9. On these supports may also be placed an upper block of steatite 11, adjusted at proper distance from the material to be baked to properly heat the upper part of the same.

In operation, the material to be baked is first placed in some suitable receptacle 12 and receives a preliminary heating in any suitable oven. At the same time the blocks of steatite 10 and 11 are also heated in any convenient manner. These blocks together with the vessel containing the material to be baked are then arranged upon the rack, and the whole lifted by means of the handles and placed within the case, the upper removable pad of non-conducting and fire-proof material placed above the rack and the case closed. The blocks of steatite will give off sufficient heat to properly maintain the temperature of the interior of the device and the material will in a proper time be fully baked without further attention.

What we claim is:

1. In a fireless baker, the combination of a case, a heat insulating lining and a fire-proof lining in the case, a removable rack in the case, and one or more heating bodies one of which is adjustably supported by the rack.

2. In a fireless baker, the combination of a case, a heat insulating and fire-proof lining in the case, heating blocks, and a removable rack in the case, said rack having spaced apart and super-posed supports for the blocks the upper support being vertically adjustable.

3. In a fireless baker, a case, heat insulating and fire-proof lining in the case, a tray, vertical rods attached to the tray near its corners and connected in pairs by transverse members forming handles, adjustable supports on the vertical rods, two super-posed and removable heating blocks, one block being in the tray and the other block resting on the adjustable supports, and a vessel to contain the material to be baked interposed between said blocks.

4. In a fireless baker, in combination with a case having a heat insulating lining, two superposed blocks of steatite, a tray to support the lower block, vertical rods attached to the tray near its respective corners, horizontal upper members connecting the vertical rods in pairs and forming handles, vertically adjustable supports on the rods to support the upper block, and a vessel interposed between the blocks.

5. In a fireless baker, the combination of a case, a fire-proof lining within the same, a removable rack in the case, and a plurality of heating bodies, one of which is adjustably supported by the rack.

6. In a fireless baker, the combination of a case having a cooking chamber with heat-insulating material in such case, and two heating bodies, one in the bottom of such chamber, the other suspended in the chamber, so as to leave a space between the two heating bodies for the food receptacle, one of said heating bodies adjustably supported.

7. In a fireless baker the combination of a case having a cooking chamber comprising a food receptacle space with heat-insulating material surrounding such chamber and a plurality of removable heating bodies mounted in said chamber and means for adjusting the distance between such bodies in order to permit the use of cooking receptacles of different sizes.

8. In a fireless baker the combination of a case having a cooking chamber comprising a food receptacle space with heat-insulating material surrounding such chamber and a plurality of removable heating bodies mounted in said chamber and a rack supporting them, said rack providing adjustable means for varying the distance between the heating bodies, and means for adjusting the distance between such bodies in order to permit the use of cooking receptacles of different sizes.

ALVIN T. THOITS.
JOHN G. GRONBERG.

Witnesses:
H. K. Dean,
A. S. Hicks.